(12) United States Patent
Shahin et al.

(10) Patent No.: US 12,523,265 B2
(45) Date of Patent: Jan. 13, 2026

(54) DRUM BRAKE SYSTEM WITH TWO TENSION SPRINGS

(71) Applicant: HL MANDO CORPORATION, Pyeongtaek-si (KR)

(72) Inventors: Hatem Shahin, Pfaffenhofen (DE); Lothar Wagner, Simmern (DE); Kai Braun, Friedrichsdorf (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 474 days.

(21) Appl. No.: 17/984,515

(22) Filed: Nov. 10, 2022

(65) Prior Publication Data

US 2023/0141474 A1    May 11, 2023

(30) Foreign Application Priority Data

Nov. 10, 2021 (DE) .......................... 102021212677.4

(51) Int. Cl.
*F16D 51/24* (2006.01)
*F16D 65/22* (2006.01)
(Continued)

(52) U.S. Cl.
CPC ............. *F16D 51/24* (2013.01); *F16D 65/22* (2013.01); *F16D 2121/04* (2013.01); *F16D 2127/02* (2013.01)

(58) Field of Classification Search
CPC .......... F16D 65/22; F16D 51/24; F16D 65/09; F16D 65/546; F16D 2121/04; F16D 2127/02
See application file for complete search history.

(56) References Cited

U.S. PATENT DOCUMENTS

| 1,718,526 A | * | 6/1929 | Christensen | ............ F16D 51/24 |
| | | | | 188/327 |
| 1,728,384 A | | 9/1929 | Stanley | |
| | | | (Continued) | |

FOREIGN PATENT DOCUMENTS

| DE | 693 01 391 T2 | 9/1996 |
| EP | 0022392 A1 * | 1/1981 |
| | (Continued) | |

OTHER PUBLICATIONS

German Office Action dated Oct. 19, 2022, issued in corresponding German Patent Application No. 102021212677.4.
Office Action From Korean Patent Office, Dated Oct. 8, 2025.

*Primary Examiner* — Bradley T King
*Assistant Examiner* — Mahbubur Rashid
(74) *Attorney, Agent, or Firm* — Harvest IP Law, LLP

(57) ABSTRACT

The present invention relates drum brake system, comprising a back plate assembly and a brake drum (1) that is rotatable with respect to the back plate assembly, the back plate assembly comprising: a back plate (2); two brake shoes (3, 3'), the two brake shoes (3, 3') being pivotably connected to the back plate (2), pivot axes (4, 4') of the brake shoes (3, 3') being disposed at or near first ends of the brake shoes (3, 3'); an actuator housing (5) with two pistons (6, 6'), the two pistons (6, 6') being configured to move outwardly, to press each piston (6, 6') against one of the brake shoes (3, 3') to pivot the respective brake shoe (3, 3') outwardly about its pivot axis (4, 4'), and to press the respective brake shoe (3, 3') against the brake drum (1) for braking; a return spring (7) extending between the brake shoes (3, 3') and being connected to both brake shoes (3, 3'), the return spring (7) being configured (7) to exert a retracting spring force that pulls both brake shoes (3, 3') away from the brake drum; two tension springs (8, 8') and a holder arrangement (9), inner ends of each of the two tension springs (8, 8') being (Continued)

connected to the holder arrangement (9), an outer end of the first tension spring (8) of the two tension springs (8, 8') being connected to a first brake shoe (3) of the two brake shoes (3, 3') and an outer end of the second tension spring (8') of the two tension springs (8, 8') being connected to a second brake shoe (3') of the two brake shoes (3, 3').

13 Claims, 7 Drawing Sheets

(51) Int. Cl.
    *F16D 121/04*     (2012.01)
    *F16D 127/02*     (2012.01)

(56) References Cited

U.S. PATENT DOCUMENTS

| | | | | |
|---|---|---|---|---|
| 1,777,344 | A * | 10/1930 | Wylie | F16D 51/22 188/327 |
| RE17,899 | E * | 12/1930 | Christensen | F16D 65/46 188/327 |
| 1,846,108 | A * | 2/1932 | Hirvonen | F16D 51/56 188/324 |
| 1,885,174 | A * | 11/1932 | Bowen | F16D 51/06 188/78 |
| 1,889,093 | A | 11/1932 | Gunn | |
| 1,896,453 | A * | 2/1933 | Loughead | F16D 51/04 188/234 |
| 1,908,745 | A * | 5/1933 | Ford | F16D 51/22 188/327 |
| 1,921,287 | A * | 8/1933 | Farkas | F16D 65/42 188/79.61 |
| 1,975,713 | A * | 10/1934 | Christenson | F16D 51/18 188/242 |
| 1,991,360 | A * | 2/1935 | Burdick | F16D 65/42 188/327 |
| 2,029,138 | A * | 1/1936 | Storrie | F16D 51/50 188/327 |
| 2,161,903 | A * | 6/1939 | Sawtelle | F16D 65/22 188/250 F |
| 2,181,022 | A * | 11/1939 | Main | F16D 51/50 188/327 |
| 2,183,432 | A * | 12/1939 | Reynolds | F16D 65/09 188/79.61 |
| 2,185,324 | A * | 1/1940 | Baisch | F16D 65/22 188/327 |
| 2,193,975 | A * | 3/1940 | Main | F16D 51/50 188/79.61 |
| 2,259,074 | A * | 10/1941 | Main | F16D 65/42 188/79.61 |
| 2,259,075 | A * | 10/1941 | Main | F16D 65/42 188/79.61 |
| 2,285,310 | A | 6/1942 | Strebinger | |
| 2,288,146 | A * | 6/1942 | Sinclair | F16D 51/20 188/327 |
| 2,366,058 | A * | 12/1944 | Schnell | F16D 65/52 188/79.53 |
| 2,381,655 | A * | 8/1945 | Edmonds | F16D 51/28 188/327 |
| 2,987,145 | A * | 6/1961 | Sampson | F16D 51/24 188/251 R |
| 5,058,713 | A * | 10/1991 | Evans | F16D 51/20 188/79.64 |
| 5,058,714 | A * | 10/1991 | Weiler | F16D 65/546 188/196 P |
| 5,062,506 | A * | 11/1991 | White | F16D 51/22 188/106 A |
| 5,311,971 | A * | 5/1994 | Courbot | F16D 65/22 188/79.54 |
| 5,630,486 | A * | 5/1997 | Maligne | F16D 65/563 188/328 |

FOREIGN PATENT DOCUMENTS

| | | | |
|---|---|---|---|
| EP | 0398546 | B1 * | 6/1993 |
| FR | 799958 | A | 6/1936 |
| JP | 2017-211003 | A | 11/2017 |
| KR | 10-2007-0045026 | A | 5/2007 |
| KR | 100738595 | B1 * | 7/2007 |
| KR | 20080025547 | A * | 3/2008 |
| KR | 10-2020-0024532 | A | 3/2020 |
| KR | 20200024532 | A * | 3/2020 |

* cited by examiner

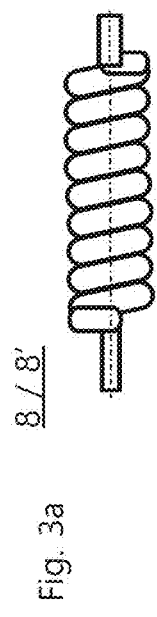
Fig. 3a  8/8'
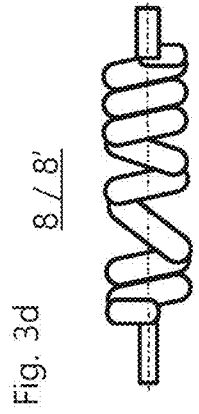
Fig. 3b  8/8'
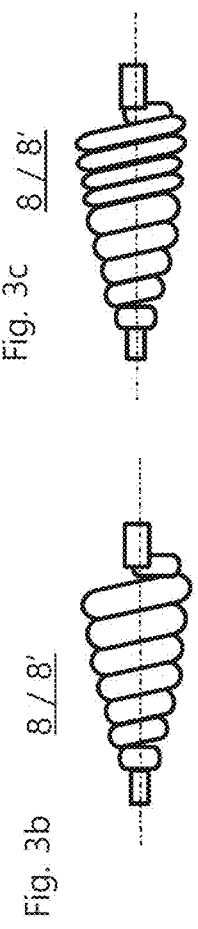
Fig. 3c  8/8'
Fig. 3d  8/8'

DRUM BRAKE SYSTEM WITH TWO TENSION SPRINGS

The present invention is in the field of mechanical engineering. It relates to a drum brake system.

Drum brake systems are complex brake systems which have some known disadvantages. Some of the main technical problems of drum brakes include a non-symmetrical pressure applied by brake shoes on the drum, and a non-constant clearance between friction material and drum after braking release. In a driving situation, this can lead to undesirable effects and may result in disadvantageous temperature conditions, heavy wear of the pads, corrosion, excess brake dust, corrosion, squeal noises and residual drag torque.

It is an object of the present invention to solve at least some of the abovementioned problems.

According to the invention, this is achieved by a drum brake system according to claim 1. Advantageous embodiments may be found in the dependent claims and in the following description and the figures.

Correspondingly, a drum brake system comprises a back plate assembly and a brake drum that is rotatable with respect to the back plate assembly.

The back plate assembly comprises a back plate.

The back plate assembly comprises two brake shoes, the two brake shoes being pivotably connected to the back plate. Pivot axes of the brake shoes are disposed at or near first ends of the brake shoes.

The back plate assembly comprises an actuator housing with two pistons, the two pistons being configured to move outwardly, to press each piston against one of the brake shoes to pivot the respective brake shoe outwardly about its pivot axis, and to press the respective brake shoe against the brake drum for braking.

The back plate assembly comprises a return spring extending between the brake shoes. The return spring is connected to both brake shoes. The return spring is configured to exert a retracting spring force that pulls both brake shoes away from the brake drum.

The back plate assembly comprises two tension springs and a holder arrangement for the two tension springs. Inner ends of each of the two tension springs are connected to the holder arrangement. An outer end of the first tension spring of the two tension springs is connected to a first brake shoe of the two brake shoes. An outer end of the second tension spring of the two tension springs is connected to a second brake shoe of the two brake shoes.

Consequently, the drum brake system has two tension springs, one for each brake shoe, in addition to the return spring connecting both brake shoes. This enables, for example, tuning of the retracting forces, in particular individual tuning for each of the brake shoes. The two tension springs may aid the retracting movement of the brake shoes. The retracting force may be tuned, for each brake shoe, by providing the additional tension springs and choosing among the various embodiments shown herein. Spring characteristics of the tension springs may be adapted for tuning a retracting, by carrying out the tension springs, for example, in the ways shown here below. Furthermore, the additional tension springs may support resumption of a desired off-braking position of the brake shoes. By way of this, for example, a constant gap between brake lining of the brake shoes and the drum faces after release of the brake may advantageously be enabled. Resumption of such a desired position may be obtained more quickly by having the additional tension springs. For example, similar or equivalent gap values for both brake shoes may be achieved.

As pointed out above, the pivot axes of the brake shoes are disposed at or near first ends of the brake shoes. These first ends typically face each other. They may constitute lower ends of the brake shoes.

In an embodiment, the return spring may extend between second ends of the brake shoes and be connected to both brake shoes at or near the second ends of the brake shoes. The outer ends of the tensions springs may be connected to the brake shoes between the return spring and the respective pivot axis of each brake shoe.

According to different embodiments, the outer ends of the tension springs may for instance be connected to the brake shoes at a position above the pistons, or below the pistons, or at the height of the pistons.

The second ends of the brake shoes may constitute upper ends of the brake shoes, for example.

In possible embodiments, at least one of the tension springs may be arranged at a non-vanishing angle with respect to the return spring. In particular, both tension springs may be arranged at a non-vanishing angle with respect to the return spring.

In embodiments of the drum brake system, the non-vanishing angle with respect to the return spring may be provided by having the inner end of the at least one of the tension springs closer to the return spring than the outer end of the at least one of the tension springs.

For at least one of the tension springs, in particular for both of the tension springs, an angle between the tensions spring and the return spring may be between 3 degrees and 30 degrees. Thereby, the angles may be measured for the two springs on sides mirrored to each other, to account for the essentially mirror-symmetrical setup of the drum brake system.

The tension springs may be arranged in a non-symmetric manner with respect to each other. In particular, attachment of the inner ends of the tension springs at the holder arrangement may be provided at different heights and/or attachment of the outer ends of the tension springs at the brake shoes may be provided at different heights.

Non-symmetric setups may enable adjusting the forces acting on the two brake shoes, in particular to address technical necessities resulting in particular from the main direction of rotation of the drum.

For example, an angle between the first tension spring and the return spring may differ from an angle between the second tension spring and the return spring. In particular the angle may differ by 2 to 5 degrees.

In an example, a spring characteristic of the first tension spring is different from a spring characteristic of the second tension spring. For example, the two tension springs may differ from one another in design, such as winding diameter and/or wire diameter and/or winding height and/or type of spring, in order to achieve a different spring characteristic for the two springs.

The tensions springs may comprise or consist of steel and/or aluminum and/or plastic.

The tensions springs may for instance be designed as coil springs.

For example, at least one of the tension springs may have a spring property that varies over its length. In an example, at least one of the tension springs has, over its length, a varying winding diameter and/or a varying wire diameter and/or a varying winding height. For example, the spring properties may be one or more of winding diameter, wire diameter, winding height, material stiffness etc. For example, the spring properties may be tuned for obtaining a desired spring characteristic for the spring in question.

In some embodiments, it may be envisioned to have a linear spring characteristic for at least one of the tension springs, in particular for both tension springs.

In embodiments of the drum brake system, the holder arrangement is connected to the actuator housing.

For example, the holder arrangement may comprise a movable holder for the first tension spring and/or for the second tension spring. The movable holder may be configured for adjusting pretension conditions of the respective tension spring.

In an example, the drum brake system further comprises a control circuit for adjusting pre-tensioning of the tension springs. The control circuit may be configured for adjusting pre-tensioning of the tension springs based on driving conditions and/or wear. To this end, the control circuit may be connected to sensor devices and/or a vehicle computer.

In the following, exemplary embodiments of the invention will be explained with reference to the figures.

Therein,

FIG. 1 shows a drum brake system,

FIGS. 2a, b show different embodiments of back plate assemblies of the drum brake system, FIGS. 3a-d show different embodiments of tension springs of the drum brake system, and FIG. 4a-g show further different embodiments of back plate assemblies.

In FIG. 1 a schematic overview of a drum brake system is shown. It comprises a back plate assembly and a brake drum 1 that is rotatable with respect to the back plate assembly.

The back plate assembly comprises a back plate 2, a first brake shoe 3 and a second brake shoe 3', wherein the two brake shoes 3, 3' are pivotably connected to the back plate 2. A first pivot axes 4 of the first brake shoe 3 and a second pivot axis 4' of the second brake shoe 3' are, in each case disposed near a first end of the respective brake shoe 3, 3', said first end being the lower end, as shown in FIG. 1.

The back plate assembly further comprises an actuator housing 5 with a first piston 6 and a second piston 6'. The first piston 6 is configured to move outwardly to the left, as indicated by an arrow, to press against the first brake shoe 3, in order to pivot the first brake shoe 3 outwardly about its pivot axis 4 and against the brake drum 1 for braking. Similarly, the second piston 6' is configured to move outwardly to the right, as indicated by an arrow, to press against the second brake shoe 3', to pivot the second brake shoe 3' outwardly about its pivot axis 4' and against the brake drum 1 for braking.

The back plate assembly also comprises a return spring 7. The return spring 7 is a coil spring. The return spring 7 extends between the first brake shoe 3 and the second brake shoe 3', and is connected to both brake shoes 3, 3'. The return spring 7 is thereby configured to exert a retracting spring force that pulls both brake shoes 3, 3' away from the brake drum. I.e., once the brakes are released and the pistons 6, 6' are retracted, the return spring 7 aids the retracting movement of both brake shoes 3, 3'.

The back plate assembly furthermore comprises a first tension spring 8 and a second tension spring 8'. Moreover, a holder arrangement 9 for the two tension springs 8, 8' is provided. An inner end of the first tension spring 8 is connected to the holder arrangement 9, at a left side of the holder arrangement, and an outer end of the first tension spring 8 is connected to the first brake shoe 3, by way of a first attachment arrangement 10. An inner end of the second tension spring 8' is connected to the holder arrangement 9, at a right side of the holder arrangement 9, opposite to the first tension spring 8. An outer end of the second tension spring 8' is connected to the second brake shoe 3' via a second attachment arrangement, the second attachment arrangement 10' being carried out in the same manner as the first attachment arrangement 10. In the case presently shown, the design of the holder arrangement 9 and the attachment arrangements 10, 10' results in a essentially mirror-symmetrical setup of the back plate assembly.

The return spring 7 extends between second ends of the brake shoes 3, 3', said second ends being upper ends of the brake shoes, according to the example shown in FIG. 1. The return spring 7 thus extends horizontally. The return spring 7 is connected to both brake shoes 3, 3' at or near their second ends. The outer ends of the tensions springs 8, 8' are connected to the brake shoes 3, 3' by way of the second attachment arrangements 10, 10' which are disposed at positions between the return spring 7 and the respective pivot axis 4, 4' of each brake shoe 3, 3'.

The holder arrangement 9 is connected to the actuator housing 5. The holder arrangement may comprise movable holders for each of the first tension spring 8 the second tension spring 8', for adjusting pre-tension conditions of the tension springs 8, 8'. A control circuit may be provided, for adjusting pretensioning of the tension springs 8, 8' based on driving conditions and/or wear.

FIGS. 2 a and b show embodiments of the back plate assembly of the drum brake system. The brake drum 1 is omitted for better visibility. It is understood that there is, in each case, a back plate 2, and the components described here below are attached to said back plate 2.

In the case of the embodiment shown in FIG. 2a, the tension springs 8, 8' have a spring property, namely a winding diameter, that varies over their length. Therein, a mirror-symmetrical setup is achieved, said variation of spring property being identical for both tension springs 8, 8', and the two tension springs having the same spring characteristic. In particular, both tensions springs 8, 8' may be tuned to have a linear or essentially linear spring characteristic.

FIG. 2b, on the other hand, shows a first tension spring 8 and a second tension spring 8' having a different spring characteristic from each other. In the example shown in FIG. 2b, the first tension spring 8 has a varying winding diameter. The second tension spring 8' has a constant winding diameter.

Different combinations of springs for the first tension spring and the second tension spring may be envisioned. In particular, the first tension spring 8 and/or the second tension spring 8' may be carried out as shown in either one of FIGS. 3a-d, and the designs shown in FIGS. 3a-d may be combined with each other. These designs may also be combined with each other, to achieve the desired characteristics for both tension springs.

FIGS. 3a-3d show different exemplary spring designs that may be utilized for one or both of the tension springs 8, 8'. The spring designs are different types of coil springs. In each of the cases shown in FIGS. 3a-3d, the springs, for example, comprise or consist of steel and/or aluminum and/or plastic. In possible variations, the material may be constant or varying over the length of the tension spring 8, 8'.

FIG. 3a shows a coil spring to be used as a tension spring 8, 8', with at least some spring properties that are non-varying over its length. The coil spring has a constant winding diameter, a constant wire diameter, and a constant winding height.

FIG. 3b shows a coil spring to be used as a tension spring 8, 8', having a varying winding diameter over its length.

FIG. 3c shows a coil spring to be used as a tension spring 8, 8', having a varying winding diameter and a varying wire diameter, over its length.

FIG. 3d shows a coil spring to be used as a tension spring 8, 8', having a varying winding height over its length.

FIGS. 4a-4g illustrate different embodiments of the back plate assembly, with a focus on different arrangements, in particular positions, for the tension springs 8, 8'. For better visibility, the return spring 7 and the tension springs 8, 8' are depicted in a simplified manner, as dashed lines, to illustrate their positions. The tension springs 8, 8' may, in each case, be carried out with varying or non-varying properties over their length and/or according to any of the possible embodiments disclosed herein. The focus of FIGS. 4a-g is on their arrangement, in particular their position with respect to each other, and their holder arrangement 9 and attachment arrangements 10, 10'.

Figure 4A:
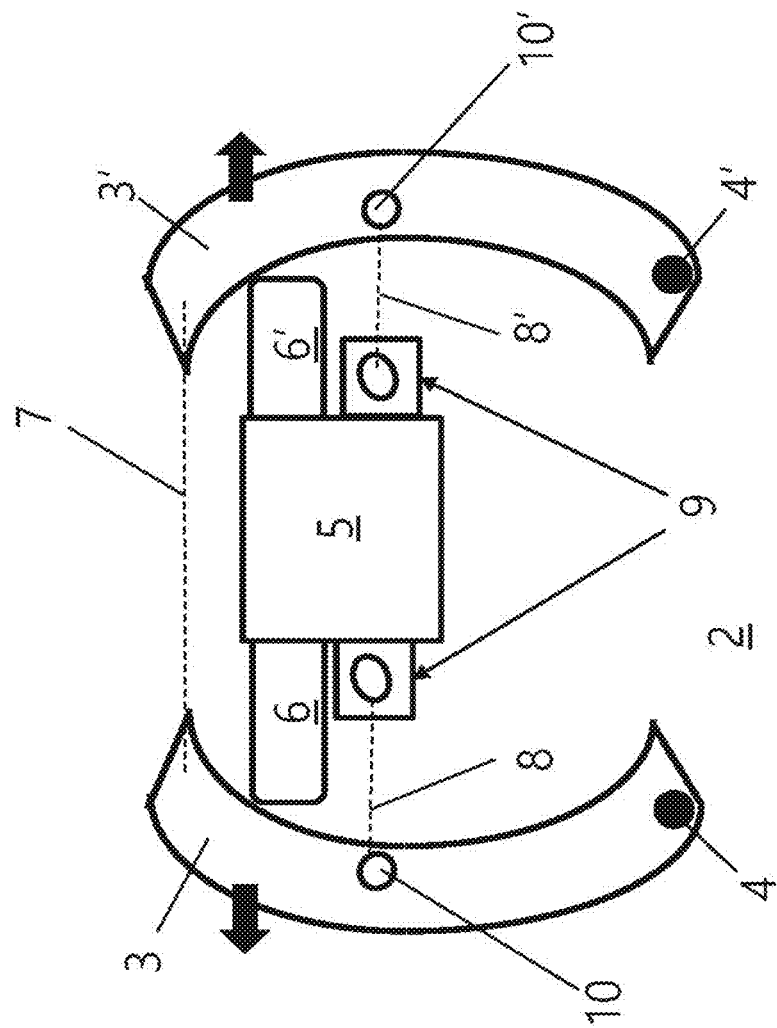

FIG. 4a shows a back plate assembly, wherein the first and second tension springs 8, 8' are both parallel to the return spring 7, i.e. the tension springs 8, 8' and the return spring 7 extend horizontally, and the angle between each of the tension springs 8, 8' and the return spring 7 vanishes. The return spring 7 is attached to the upper ends of the brake shoes 3, 3', and the tension springs 8, 8' are attached to the brake shoes 3, 3' between the return spring 7 and the pivot axes 4, 4'. The attachment arrangements 10, 10' for the tension springs 8, 8' are each carried out as openings present in the brake shoes 3, 3', in which the tension springs 8, 8' are anchored in each case. The pistons 6, 6' engage with the brake shoes 3, 3' at a positon that is between the attachment arrangements 10, 10' and the return spring 7.

Figure 1:
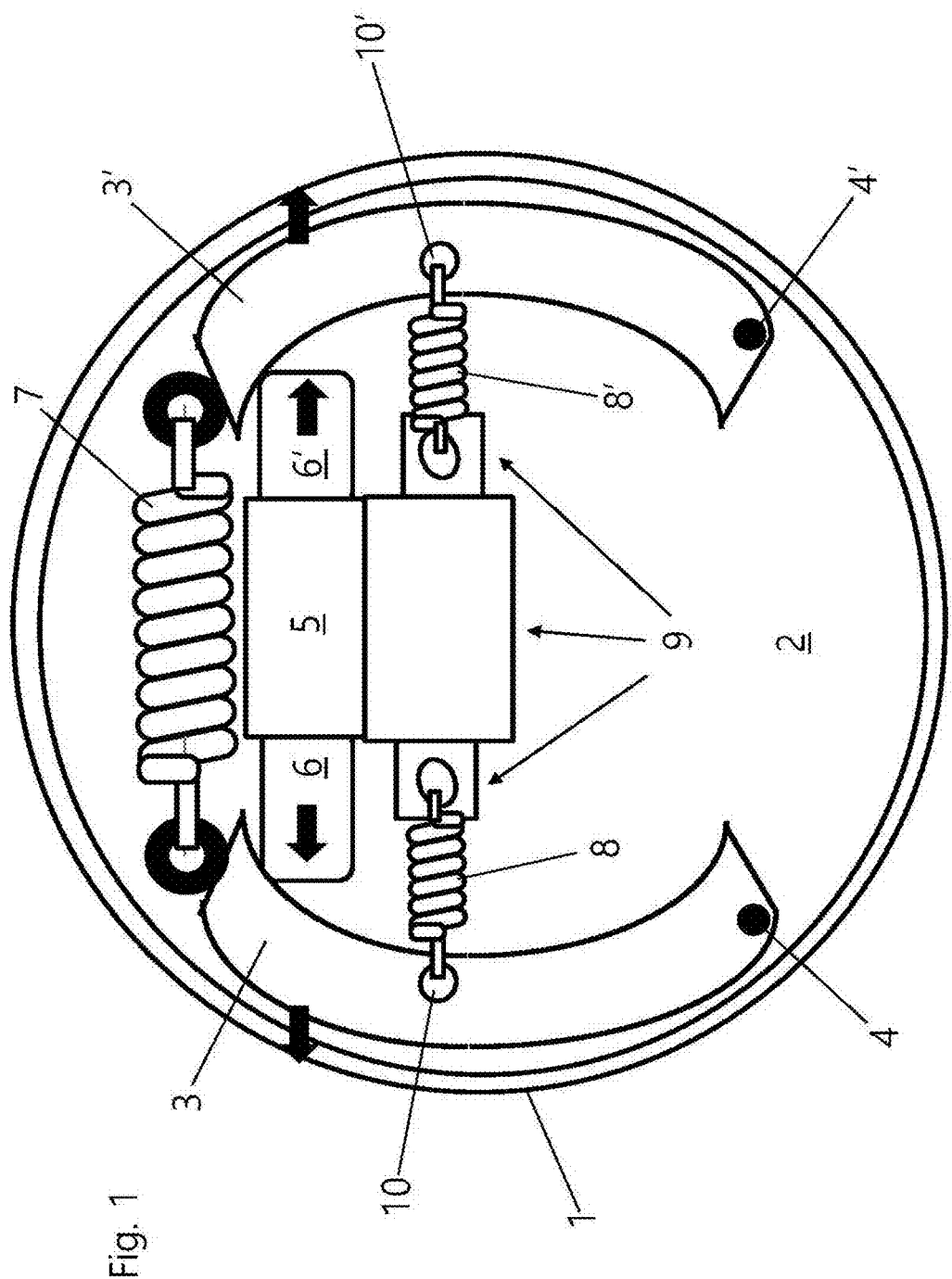
Figure 2A:
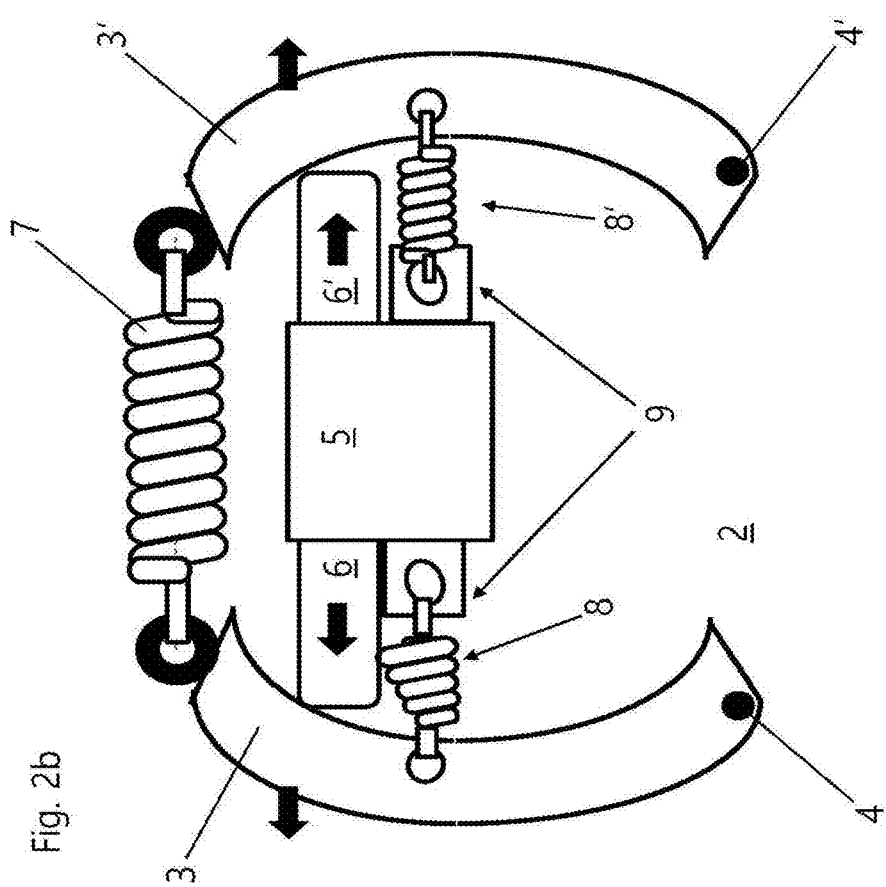
Figure 2B:
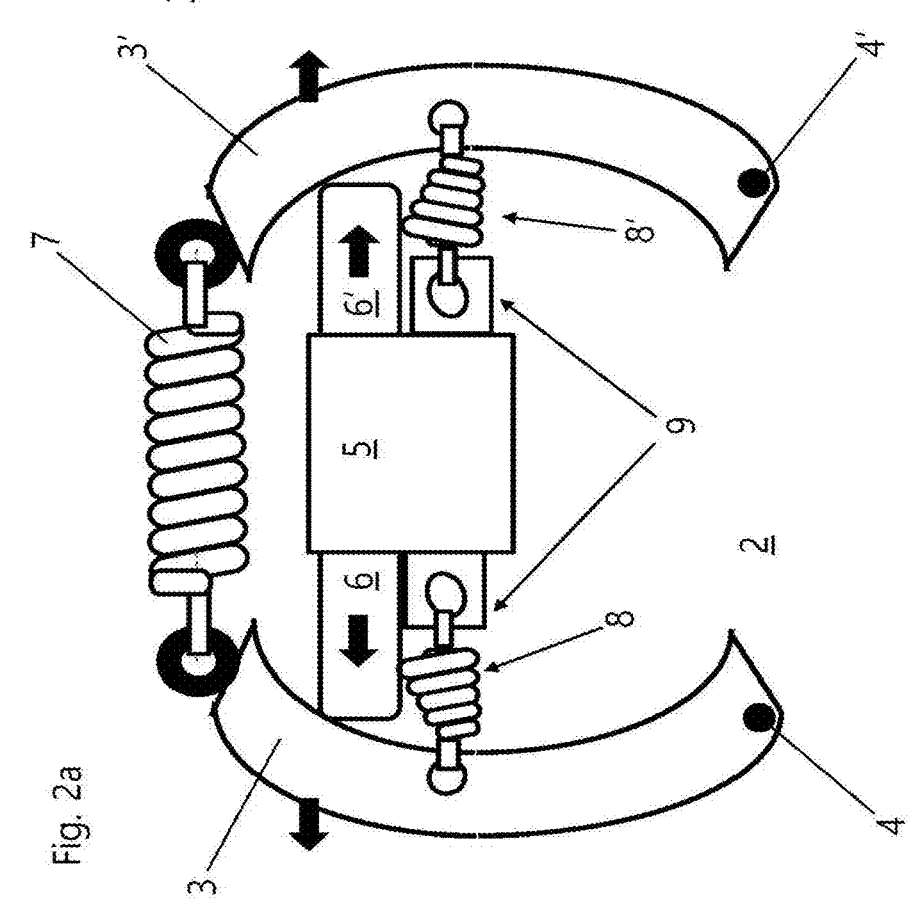
Figure 4C:
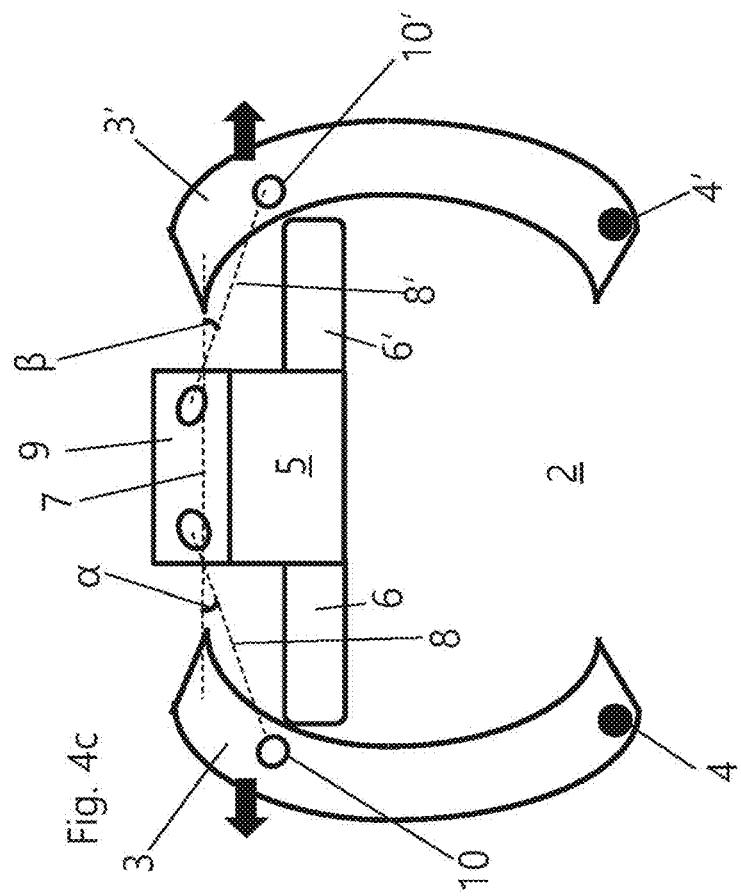
Figure 4B:
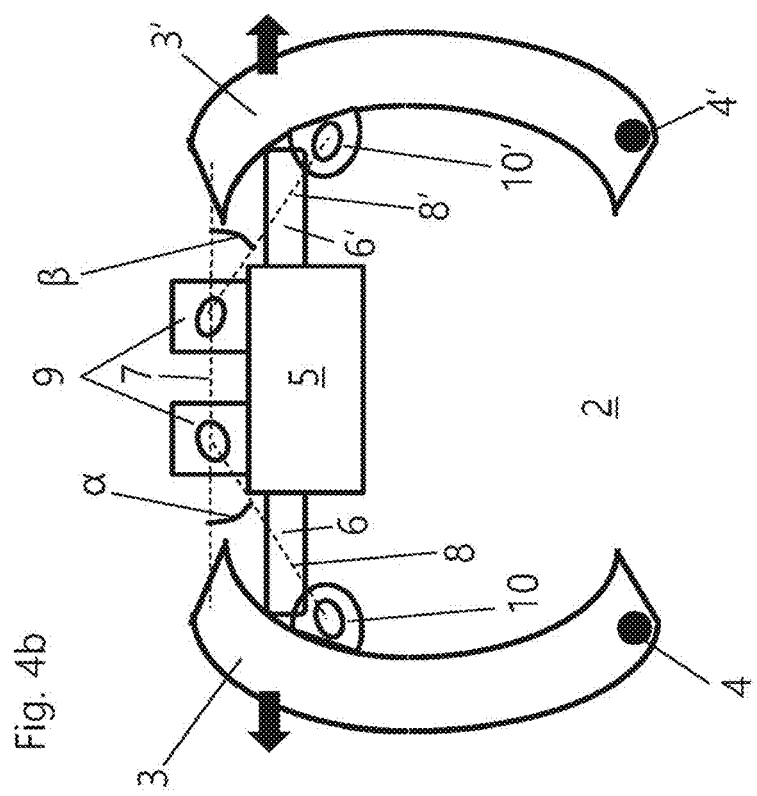

FIG. 4b depicts a back plate assembly, wherein the tension springs 8, 8' are both arranged at an angle with respect to the return spring 7. A first angle α is given between the return spring 7 and the first tension spring 8, and a second angle 3 is given between the return spring 7 and the second tension spring 8' (the angles α and β being measured on opposing sides, to account for their mirrored arrangement). The angles α and β are, in each case, between 3 and 30 degrees. They may deviate from each other, for instance by 2-5 degrees, to provide different forces for the two brake shoes 3, 3', accounting for the different forces acting thereon, due to the main rotating direction of the brake drum 1 (not shown, cf. FIG. 1). The holder arrangement 9 is arranged on top of the actuator housing 5 and attached thereto, the tension springs 8, 8' being anchored to the holder arrangement 9 at approximately the height of the return spring 7, and above the pistons 6, 6'. The tension springs 8, 8' extend outward and downward (at angles α and β, respectively), their outer ends being below the pistons 6, 6'. Thus, the inner ends the tension springs 8, 8' are closer to the return spring 7 than the outer ends of the tension springs 8, 8'.

Attachments rings are attached to the brake shoes 3, 3', as part of the attachment arrangements 10, 10', for holding the outer ends of the tension springs 8, 8'.

FIG. 4c shows another back plate assembly with non-vanishing angles α and β for the tension springs 8, 8'. Once again, a and β are between 3 and 30 degrees and may deviate from each other, for instance by 2-5 degrees. The outer ends of the tension springs 8, 8' and their attachment arrangements 10, 10' at the brake shoes 3, 3' are slightly above the pistons 6, 6'.

Figure 4E:
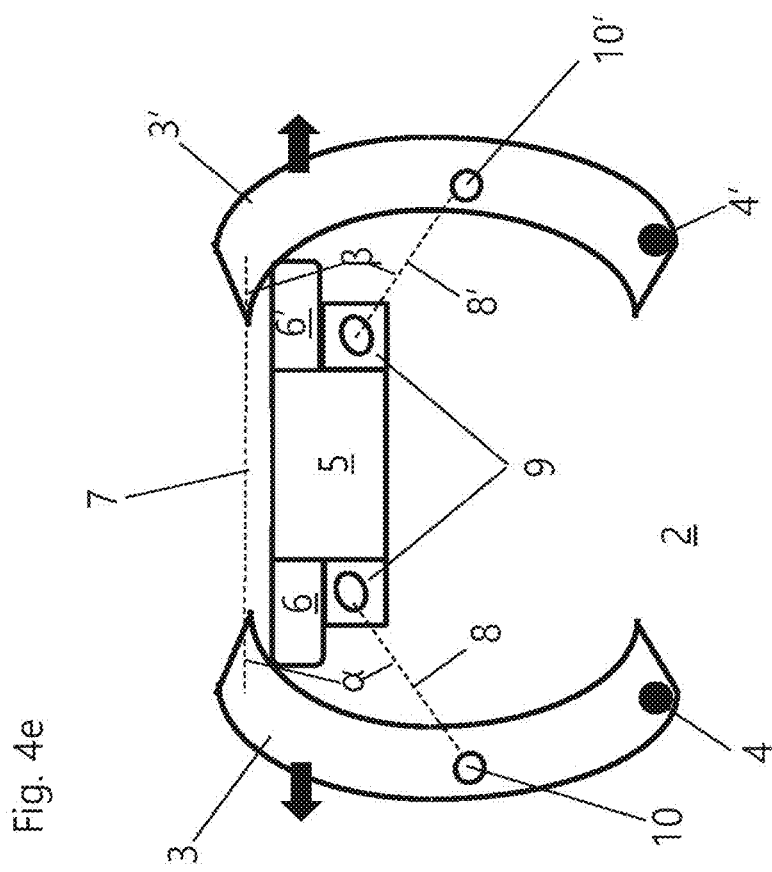
Figure 4D:
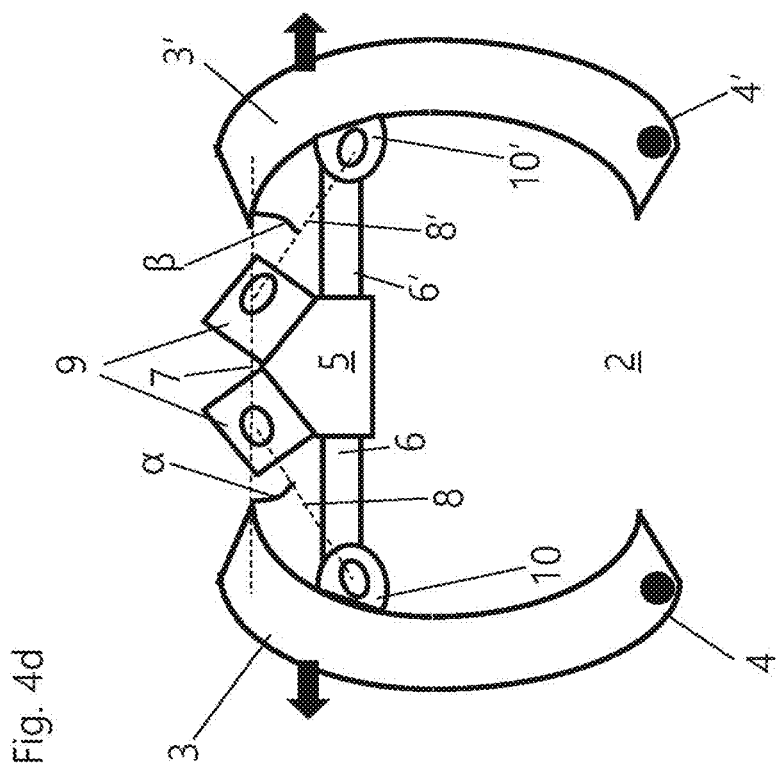

FIG. 4d shows a further back plate assembly with non-vanishing angles α and β for the tension springs 8, 8'. The angles may for instance be chosen as indicated above. The holder arrangement 9 comprises two holders that are attached to the actuator housing 5. To this end, the actuator housing 5 has sloped upper surfaces on which the holders of the holder arrangement 9 are disposed. The upper surfaces extend parallel or essentially parallel to the direction of the tension springs 8, 8'. Setups of this type may advantageously be envisioned if a movable design of the holder arrangement 9, for adjusting pretensioning of the tension springs 8, 8', is desired. The holders can then be slidably arranged on the sloped surfaces.

FIG. 4e shows a further back plate assembly with non-vanishing angles α and β for the tension springs 8, 8'. The angles may for instance be chosen as indicated above. The holder arrangement 9 is carried out in such a manner that the inner ends of the tension springs 8, 8' are below the pistons 6, 6'. Both tension springs 8, 8' extend outward and downward (at angles α and β, respectively), and their outer ends are attached to the brake shoes 3, 3', their attachment arrangements 10, 10' being provided between the pistons 6, 6' and the pivot axes 4, 4'.

Figure 4G:
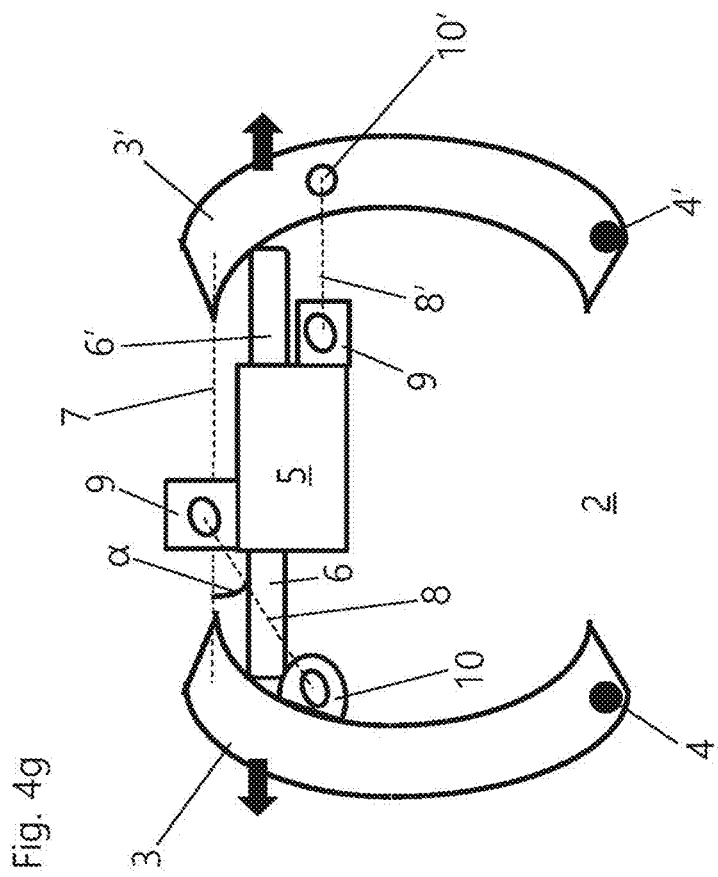
Figure 4F:
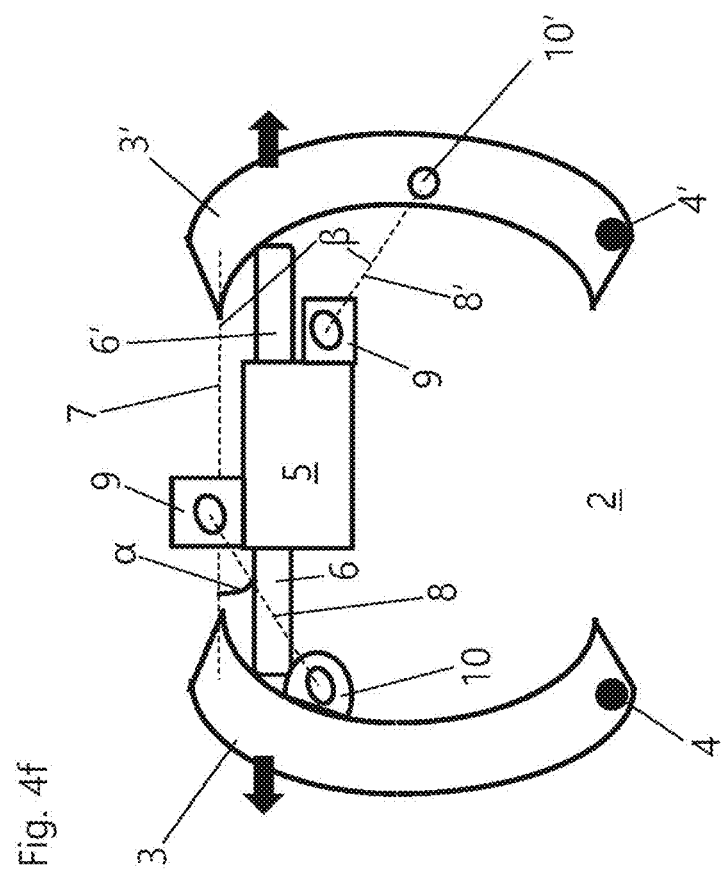

FIG. 4f shows a further back plate assembly with non-vanishing angles α and β for the tension springs 8, 8'. The angles may for instance be chosen as indicated above. The example of FIG. 4f is an asymmetric setup, wherein the first tension spring 8 and the second tension spring 8', including their attachment to the holder arrangement 9 and their attachment to the respective brake shoe 3, 3' differ from each other. Specifically, for the first tension spring 8, the holder of the holder arrangement 9 is above the pistons 6, 6', and the first attachment arrangement 10 at the first brake shoe 3 is below the pistons 6, 6'. For the second tension spring 8', the holder of the holder arrangement 9 is below the pistons 6, 6', as is the second attachment arrangement 10'. The embodiment of FIG. 4f exemplarily demonstrates that the tension springs 8, 8' may be arranged in a non-symmetric manner with respect to each other, wherein, in particular, attachment of the inner ends of the tension springs 8, 8' at the holder arrangement 9 may be provided at different heights and/or attachment of the outer ends of the tension springs 8, 8' at the brake shoes 3, 3' may be provided at different heights. Other asymmetric setups may are envisioned, which may be derived for example by combining any of the designs shown in the previous figures, FIGS. 4a-4e.

FIG. 4g shows another example of an asymmetric setup. Herein, the first tension spring 8 has an angle α which may for instance be between 3 and 30 degrees. The second tension spring 8 is arranged in parallel to the return spring 7, so that the second angle β vanishes. It is understood that a vanishing angle may be combined for instance with any of the arrangements of FIGS. 4b-4e.

LIST OF REFERENCE NUMERALS

1 Brake Drum
2 Back Plate
3 First Brake Shoe
3' Second Brake Shoe
4 First Pivot Axis
4' Second Pivot Axis
5 Actuator Housing
6 First Piston
6' Second Piston
7 Return Spring
8 First Tension Spring
8' Second Tension Spring
9 Holder Arrangement
10 First Attachment Arrangement 10' Second Attachment Arrangement
α First Angle
β Second Angle

The invention claimed is:

1. A drum brake system, comprising a back plate assembly and a brake drum (1) that is rotatable with respect to the back plate assembly,
the back plate assembly comprising:
a back plate (2);
two brake shoes (3, 3'), the two brake shoes (3, 3') being pivotably connected to the back plate (2), pivot axes (4, 4') of the brake shoes (3, 3') being disposed at positions adjacent to first ends of the brake shoes (3, 3');
an actuator housing (5) with two pistons (6, 6'), the two pistons (6, 6') being configured to move outwardly, to press each piston (6, 6') against one of the brake shoes (3, 3') to pivot the respective brake shoe (3, 3') outwardly about its respective pivot axis (4, 4'), and to press the respective brake shoe (3, 3') against the brake drum (1) for braking;
a return spring (7) extending between the brake shoes (3, 3') and being connected to both brake shoes (3, 3'), the return spring (7) being configured to exert a retracting spring force that pulls both brake shoes (3, 3') away from the brake drum (1);
a pair of tension springs (8, 8') comprising a first tension spring (8) and a second tension spring (8'), and a holder arrangement (9), inner ends of the first tension springs and the second tension spring (8') being connected to the holder arrangement (9), an outer end of the first tension spring (8) being connected to a first brake shoe (3), and an outer end of the second tension spring (8') being connected to a second brake shoe (3'),
wherein the holder arrangement (9) is connected to the actuator housing (5) and,
wherein the holder arrangement (9) comprises a movable holder for the first tension spring (8) and for the second tension spring (8') for adjusting pre-tension conditions of the first tension spring (8) and the second tension spring (8').

2. The drum brake system according to claim 1, wherein the return spring (7) extends between second ends of the brake shoes (3, 3') and is connected to both brake shoes (3, 3') at positions adjacent to the second ends of the brake shoes (3, 3'), and wherein the outer ends of the tension springs (8, 8') are connected to the brake shoes (3, 3') between the return spring (7) and the respective pivot axis (4, 4') of each brake shoe (3, 3').

3. The drum brake system according to claim 1, wherein at least one of the tension springs (8, 8') is arranged at a non-vanishing angle (α, β) with respect to the return spring (7).

4. The drum brake system according to claim 3, wherein the non-vanishing angle (α, β) with respect to the return spring (7) is provided by having the inner end of the at least one of the tension springs (8, 8') closer to the return spring (7) than the outer end of the at least one of the tension springs (8, 8').

5. The drum brake system according to claim 1, wherein for each of the tension springs (8, 8'), angles (α, β) between the tension springs (8, 8') and the return spring (7) is between 3 degrees and 30 degrees.

6. The drum brake system according to claim 5, wherein a first angle (α) between the first tension spring (8) and the return spring (7) differs from a second angle (β) between the second tension spring (8') and the return spring (7), wherein a difference between the first angle (α) and the second angle (β) is between 2 degrees and 5 degrees.

7. The drum brake system according to claim 1, wherein the tension springs (8, 8') are arranged in a non-symmetric manner with respect to each other, in particular attachment of the inner ends of the tension springs (8, 8') at the holder arrangement (9) being provided at different heights and/or attachment of the outer ends of the tension springs (8, 8') at the brake shoes (3, 3') being provided at different heights.

8. The drum brake system according to claim 1, wherein the tension springs (8, 8') comprise or consist of steel and/or aluminium and/or plastic.

9. The drum brake system according to claim 1, wherein at least one of the tension springs (8, 8') has a spring property that varies over its length.

10. The drum brake system according to claim 9, wherein the at least one of the tension springs (8, 8') has, over its length, a varying winding diameter and/or a varying wire diameter and/or a varying winding height.

11. The drum brake system according to claim 1, wherein a spring characteristic of the first tension spring (8) is different from a spring characteristic of the second tension spring (8').

12. The drum brake system according to claim 11, wherein at least one of the tension springs (8, 8') has a linear characteristic.

13. The drum brake system according to claim 1, further comprising a control circuit for adjusting pre-tensioning of the tension springs (8, 8') based on driving conditions and/or wear.

* * * * *